United States Patent
Bulman

(10) Patent No.: US 6,568,171 B2
(45) Date of Patent: May 27, 2003

(54) ROCKET VEHICLE THRUST AUGMENTATION WITHIN DIVERGENT SECTION OF NOZZLE

(75) Inventor: Melvin J. Bulman, Folsom, CA (US)

(73) Assignee: Aerojet-General Corporation, Sacramento, CA (US)

(*) Notice: Subject to any disclaimer, the term of this patent is extended or adjusted under 35 U.S.C. 154(b) by 0 days.

(21) Appl. No.: 09/899,813

(22) Filed: Jul. 5, 2001

(65) Prior Publication Data

US 2003/0005701 A1 Jan. 9, 2003

(51) Int. Cl.[7] ............... F02K 1/30; F02K 3/10; F02K 9/97
(52) U.S. Cl. ............... 60/224; 60/258; 60/761; 239/265.17; 239/265.23
(58) Field of Search .......... 60/224, 231, 235, 60/253, 251, 258, 250, 244, 245, 761, 762; 239/265.17, 265.23

(56) References Cited

U.S. PATENT DOCUMENTS

| | | | |
|---|---|---|---|
| 2,939,275 A | * 6/1960 | Loedding | 60/253 |
| 2,952,123 A | * 9/1960 | Rich | 60/231 |
| 2,981,059 A | 4/1961 | Horner et al. | |
| 3,032,970 A | * 5/1962 | Fox | 60/253 |
| 3,091,924 A | * 6/1963 | Wilder, Jr. | 60/231 |
| 3,095,694 A | * 7/1963 | Walter | 60/253 |
| 3,120,737 A | * 2/1964 | Holloway | 60/253 |
| 3,128,599 A | * 4/1964 | Carr | 60/253 |
| 3,147,590 A | * 9/1964 | Thielman | 60/231 |
| 3,233,833 A | * 2/1966 | Bertin et al. | 60/231 |
| 3,374,631 A | * 3/1968 | Marks | 60/761 |
| 3,668,872 A | * 6/1972 | Camp et al. | 239/127.3 |
| 3,698,642 A | * 10/1972 | McCullough | 239/265.23 |
| 3,739,984 A | 6/1973 | Tontini | |
| 3,759,039 A | * 9/1973 | Williams | 239/265.23 |
| 4,137,286 A | 1/1979 | Bornstein | |
| 4,220,001 A | 9/1980 | Beichel | |
| 4,223,606 A | 9/1980 | Bornstein | |
| 4,574,700 A | * 3/1986 | Lewis | 102/287 |
| 4,947,644 A | 8/1990 | Hermant | |
| 5,067,316 A | 11/1991 | Bonniot | |
| 5,111,657 A | * 5/1992 | Hivert et al. | 60/224 |
| 5,220,787 A | 6/1993 | Bulman | |
| 5,463,866 A | 11/1995 | Klees | |
| 5,537,815 A | * 7/1996 | Marguet et al. | 60/224 |
| 6,050,085 A | 4/2000 | Mayer | |

OTHER PUBLICATIONS

M.J. Bulman and T. Neill, "Simulated LOX–augmented nuclear thermal rocket (LANTER) testing," 36th AIAA/ASME/SAE/ASEE Joint Propulsion Conference and Exhibit, 16–19 Jul. 2000, Huntsville, Alabama.

R.A. O'Leary and J.E. Beck, ""Nozzle Design," *Threshold Journal* (1992) The Boeing Company, pp. 1–13.

* cited by examiner

*Primary Examiner*—Ted Kim
(74) *Attorney, Agent, or Firm*—Townsend and Townsend and Crew LLP

(57) ABSTRACT

Augmentation of the thrust achieved by a supersonic nozzle of continuous curvature is achieved by causing secondary combustion to occur in an annular region of the interior of the divergent section of the nozzle. The secondary combustion forms a secondary combustion gas that complements the primary combustion gas passing through the nozzle and maintains a wall pressure that is equal to or greater than ambient pressure at low altitudes, eliminating the negative component of the thrust in an overexpanded nozzle at takeoff.

3 Claims, 2 Drawing Sheets

ROCKET VEHICLE THRUST AUGMENTATION WITHIN DIVERGENT SECTION OF NOZZLE

This invention resides in the technology of nozzle construction for supersonic propulsion systems.

BACKGROUND OF THE INVENTION

Rocket-powered launch vehicles require high thrust at takeoff to overcome inertia, particularly since the vehicle is at its greatest weight due to the unburned fuel. Takeoff typically occurs at sea level, but at high altitude, where the vehicle performs its primary mission, a high specific impulse (Isp) is desired. This is most readily achieved when the nozzle has a high area ratio, which is the ratio of the area at the nozzle exit to the area at the throat. Achieving a high thrust at sea level and a high area ratio are conflicting goals, since at sea level the high area ratio results in a wall pressure near the nozzle exit that is below ambient pressure. This causes a negative thrust in the portion of the nozzle near the exit, lowering the overall thrust.

Certain attempts to eliminate the negative component of the sea level thrust while still achieving high vacuum thrust have involved the use of variable area nozzles, i.e., those in which the area at the exit is reduced for launch and then gradually increased during ascent. To achieve this, variable area nozzles have thus been designed to permit adjustments to the contour, area ratio and length as the vehicle altitude increases. Unfortunately, altitude compensation features such as these add considerable complexity as well as weight to the engine construction, and in most cases the nozzle still yields less thrust at sea level than at vacuum. Dual-fuel concepts have also been proposed. These include kerosene-fueled engines combined with engines derived from the Space Shuttle Main Engine (SSME), engines that combine kerosene-fueled engines combined with hydrogen-fueled engines such as the Russian RD-701 engine, the dual-fuel, dual-expander engine concept as set forth in Beichel, R., U.S. Pat. No. 4,220,001 (issued Sep. 2, 1980), and the dual-thrust rocket motor of Bornstein, L., U.S. Pat. Nos. 4,137,286 (issued Jan. 30, 1979) and 4,223,606 (issued Sep. 23, 1980). The Beichel engine requires a complex nozzle design that incorporates two thrust chambers, while the Bornstein motor achieves dual thrust by using separate sustainer and booster propellant grains in the combustion chamber, together with an igniter and squib that are inserted into the grain itself.

SUMMARY OF THE INVENTION

The present invention resides in a jet propulsion system that achieves both high thrust at sea level and high Isp at high altitude, without the thrust reduction at sea level that is otherwise caused by exit region wall pressures that are below ambient. To achieve this, the system includes a supersonic nozzle of continuous curvature in which secondary combustion occurs in an annular region of the interior of the divergent section of the nozzle. The secondary combustion forms a secondary combustion gas that complements the primary combustion gas passing through the nozzle. The secondary combustion gas maintains a wall pressure that is equal to or greater than ambient pressure at low altitudes, eliminating the negative component of the takeoff thrust. The invention is thus well suited to high area ratio nozzles, and particularly to nozzles that are otherwise overexpanded. Vehicles to which this invention can be applied include the Space Shuttle Main Engine (SSME), single-stage-to-orbit (SSTO) vehicles, and other vehicles in which the thrust at sea level might otherwise be compromised by the need for high Isp at high altitudes. The benefits of this invention can be achieved with only slight modifications to existing nozzles and with no change to the nozzle geometry.

These and other features, embodiments and advantages of the invention will be apparent from the description that follows.

DETAILED DESCRIPTION OF THE INVENTION AND PREFERRED EMBODIMENTS

Figure 1:
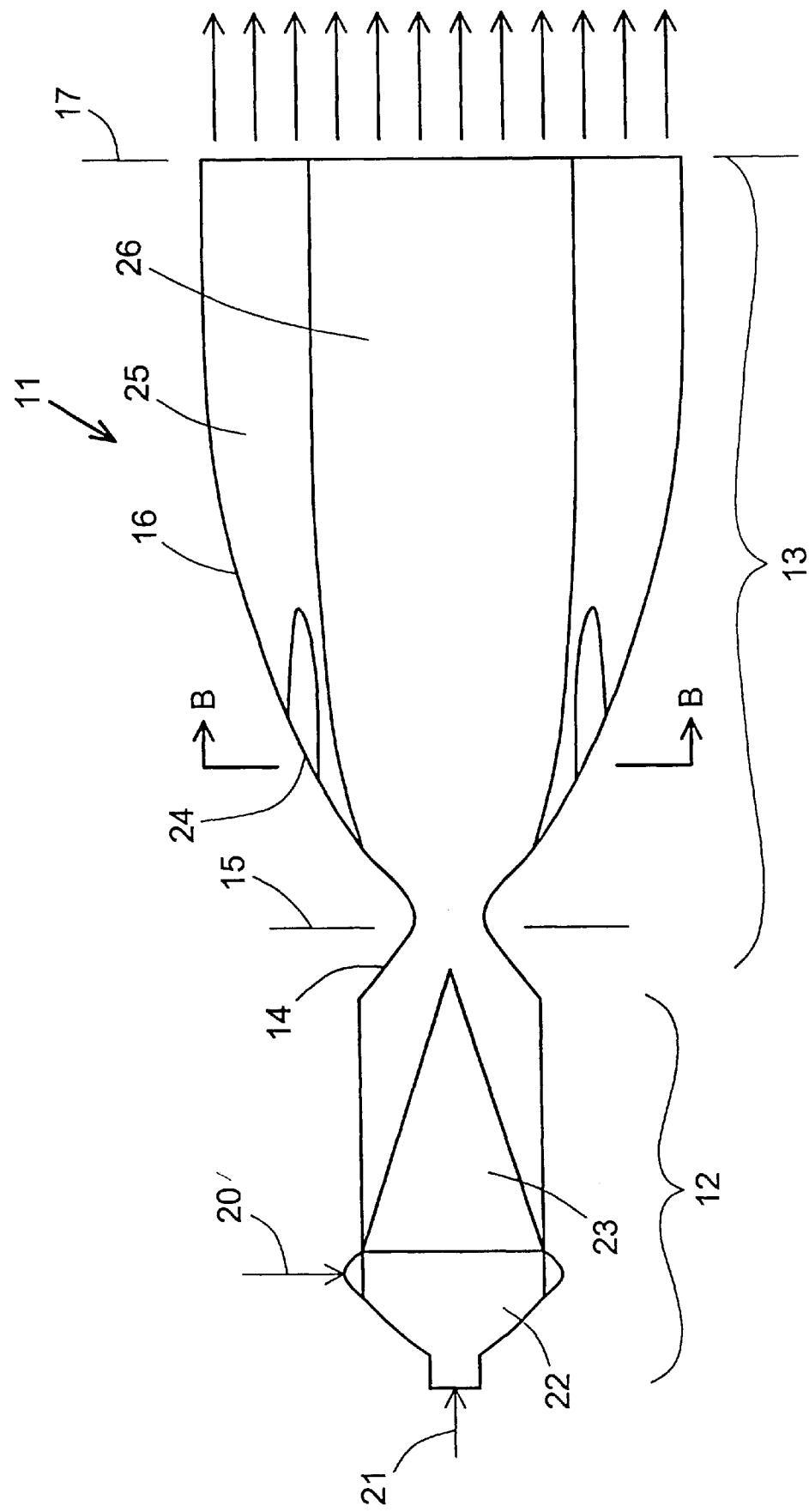
FIG. 1 is an axial cross section of a supersonic nozzle modified in accordance wit this invention to include injectors supplying fuel and oxidizer to the divergent section of the nozzle.

Supersonic nozzles are defined by a convergent section, a throat, and a divergent section, and in those to which this invention is applicable the divergent section has an axial profile of continuous curvature. By "axial profile" is meant the profile of the divergent section determined by a cross section along a plane that includes the nozzle axis. A "continuous curvature" is one that forms a smooth curve with no abrupt changes in radius of curvature and no changes in the direction of curvature, although the radius of curvature may vary or remain constant. This is distinct from nozzles with discontinuous curvature that are specifically intended to cause the gas jet inside the nozzle to separate from the nozzle wall at the discontinuity. Such nozzles are not addressed by the present invention.

The term "curve" is used in the mathematical sense and includes straight lines as well as conventional curves, thus including both conical nozzles and hyperbolic or bell-shaped nozzles. The present invention extends to nozzles that cause the jet to separate from the wall near the nozzle exit due to overexpansion as well as nozzles in which the jet does not separate. The invention is particularly useful however in overexpanded nozzles.

The term "overexpanded nozzle" is used herein as it is in the rocketry art to mean a nozzle in which the area ratio, defined as the ratio of the area at the nozzle exit to the area at the throat, is so great that the gas expansion occurring in the nozzle results in a gas pressure at the nozzle exit that is below ambient pressure at sea level. Area ratios that achieve this may vary, and the nozzle configuration that produces overexpansion will vary with the chamber pressure, the area ratio and the ambient pressure. For rockets with relatively low chamber pressure, such as the first stage of a Delta II booster rocket in which the chamber pressure is approximately 800 psia, overexpansion can occur with an area ratio as low as 27:1. For rockets with higher chamber pressures, overexpansion occurs only at considerably higher area ratios. In general, therefore, when the invention is applied to overexpanded nozzles, the area ratio may be about 25:1 or higher, preferably from about 25:1 to about 150:1, and more preferably about 65:1 to about 85:1. SSME Class engines, for example, have area ratios in the range of 74:1 to 80:1. Area ratios of 77.5:1 or less, for example 70:1 to 77.5:1, are preferred for purposes of avoiding or minimizing gas flow separation from the nozzle wall.

Other dimensions of the nozzle may vary as well and are not critical to this invention. A typical SSME may have a nozzle throat diameter of 10.3 inches (24 cm), increasing to a diameter of 90.7 inches (230 cm) at the nozzle exit over a length of 121 inches (307 cm). The area ratio of this nozzle, which is only an example, is 77.5:1 and the length of the nozzle is equal to 80% of a 15° conical nozzle. Again as an example, typical operating conditions of a conventional nozzle of this type, before being modified in accordance with the present invention, are a sea level thrust of 355,000 pounds-force (1,580,000 newtons), a gas flow rate of 970 pounds/second (440 kg/sec), a sea level Isp of 365, a nozzle exit pressure of 2 psia, a vacuum thrust of 442,000 pounds-force (1,966,000 newtons) and a vacuum Isp of 455. With the addition of a secondary combustion gas in accordance with the present invention, the sea level thrust can be increased to almost three times the value quoted above.

In accordance with this invention, the secondary combustion gas is generated in an annular region of the interior of the divergent section of the nozzle. This is done by the injection of liquid propellant into the divergent section by means other than through the throat. Thus, fuel and oxidizer can be injected through one or more injectors built into the wall at the divergent section. The injector(s) direct the fuel and oxidizer into the annular region of the divergent section and they combust after injection.

Figure 2:
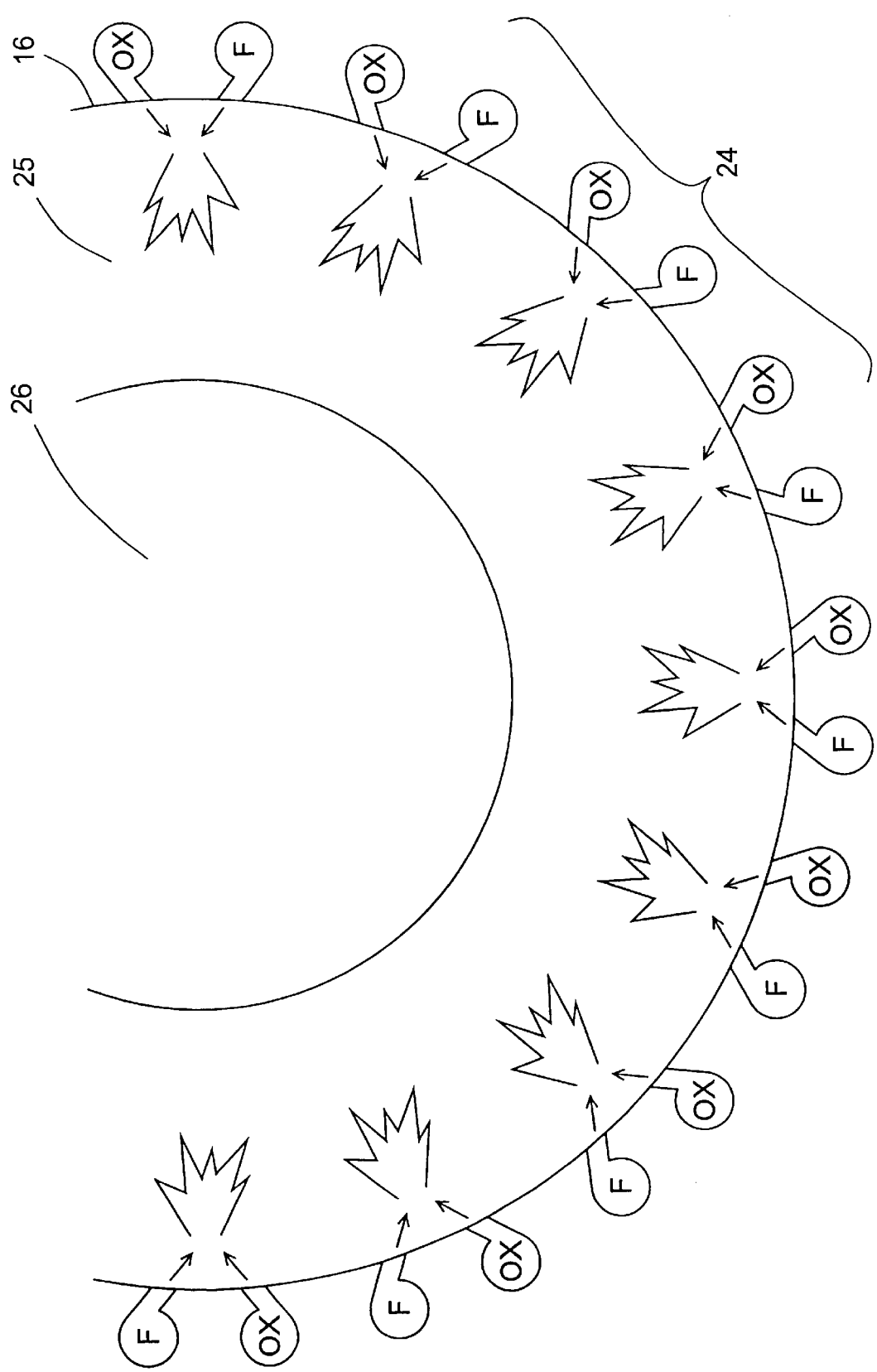
FIG. 2 is a transverse cross section of the divergent section of the modified supersonic nozzle of FIG. 1 at the location of the injectors (i.e., along the line B–B of FIG. 1).

A diagrammatic representation of one means of embodying this invention in a supersonic rocket engine is shown in FIGS. 1 and 2. FIG. 1 is an axial cross section of a supersonic rocket engine 11 that includes a primary combustion chamber 12 and a nozzle 13, the nozzle including a convergent section 14, a throat 15, and a divergent section 16, terminating in a nozzle exit 17. Fuel 20 and oxidizer 21 are fed to the combustion chamber through a primary injector 22 where primary combustion 23 occurs. The combustion product gas flows through the nozzle throat 15 into the divergent section 16 where it expands to fill the widening cross sectional area. Injectors 24 of fresh fuel and oxidizer are distributed around the periphery of the divergent section a short distance downstream of the throat. Upon entering the nozzle, the fuel and oxidizer combust to form secondary combustion gas which fills the annular region 25 surrounding the core flow 26 of primary combustion gas.

FIG. 2 is a transverse cross section of the divergent region at the location of the secondary fuel and oxidizer injectors. The injectors 24 are several in number, fuel injectors alternating with oxidizer injectors, and are distributed around the circumference of the divergent section. Fuel and oxidizer from each pair at injectors meet inside the nozzle and combust to form the annular flow of secondary gas. At takeoff; secondary fuel and oxidizer are injected through all secondary fuel and oxidizer injectors in the array, creating the maximum secondary gas flow in the annular region and reducing the expansion of the primary gas flow in the core region 26. As the vehicle gains altitude and loses mass, the thrust requirement decreases, and as the external pressure drops, the risk of a negative thrust component due to overexpansion of the core gas is gradually eliminated. To accommodate these changes, the secondary fuel and oxidizer injectors are throttled, thereby lowering the secondary thrust in continuous manner.

The sources of secondary fuel and oxidizer can be individual sources independent of the fuel and oxidizer used for the primary combustion. Alternatively, common sources can be used for both the primary and secondary injectors of both fuel and oxidizer, with the feed to the secondary injectors being drawn separately off of the common source. The design, configurations, and arrangement of the injectors, sources, and feed lines are within the routine skill of the experienced rocket engineer.

The foregoing description focuses on particular embodiments of the invention for purposes of explanation and illustration. Further embodiments and modifications of the above will be apparent to those skilled in the art upon reviewing this description, such embodiments and modifications falling within the scope of the invention as defined by the appended claims.

What is claimed is:

1. A rocket propulsion system comprising:
    a supersonic rocket nozzle defined by a convergent section, a throat, and a supersonic divergent section; and
    means for causing combustion inside an annular region of said supersonic divergent section and only in said supersonic divergent section, by injecting and burning liquid propellant in said annular region in a manner that will produce thrust augmentation, said means comprising a plurality of injectors positioned at locations distributed along the circumference of said supersonic divergent section to inject liquid fad and liquid oxidizer circumferentially towards each other into said annular region.

2. A rocket propulsion system in accordance with claim 1 in which said supersonic rocket nozzle is an overexpanded supersonic nozzle.

3. A rocket propulsion system in accordance with claim 1 in which said supersonic rocket nozzle has an axial profile of continuous curvature.

* * * * *